(12) United States Patent
Bacon

(10) Patent No.: US 6,210,087 B1
(45) Date of Patent: Apr. 3, 2001

(54) TAIL GATE LOAD ORGANIZING DEVICE

(76) Inventor: Francis Phillip Bacon, 52 Mountain Rd., Hamburg, NJ (US) 07419

( * ) Notice: Subject to any disclaimer, the term of this patent is extended or adjusted under 35 U.S.C. 154(b) by 0 days.

(21) Appl. No.: 09/201,616

(22) Filed: Nov. 30, 1998

(51) Int. Cl.[7] ..................................................... B60P 7/08
(52) U.S. Cl. ................ 410/35; 410/32; 410/36; 410/42; 410/121; 410/129; 296/26.11
(58) Field of Search .................. 410/32, 34–36, 410/42, 121, 129; 296/3, 26.08, 57.1, 26.11; 224/405, 525, 526

(56) References Cited

U.S. PATENT DOCUMENTS

| | | | | |
|---|---|---|---|---|
| 7,575 | * | 5/1850 | Drake ........................................ | 410/32 |
| D. 248,228 | | 6/1978 | Robertson . | |
| 2,855,217 | * | 10/1958 | Bagwell ................... | 410/32 |
| 4,023,850 | | 5/1977 | Tillery . | |
| 4,114,944 | | 9/1978 | Joynt et al. . | |
| 4,389,067 | | 6/1983 | Rubio . | |
| 5,116,096 | | 5/1992 | Taylor . | |
| 5,169,202 | * | 12/1992 | Cupp et al. ..................... | 296/57.1 X |
| 5,265,993 | | 11/1993 | Wayne ................................. | 410/129 |
| 5,433,566 | * | 7/1995 | Bradley ................................. | 410/121 |
| 5,465,883 | * | 11/1995 | Woodward ........................ | 224/405 X |
| 5,522,685 | * | 6/1996 | Lessard ................................. | 410/121 |
| 5,567,096 | * | 10/1996 | Howard ................................. | 410/42 |
| 5,823,597 | * | 10/1998 | Anderson .......................... | 296/26.08 |
| 5,871,316 | * | 2/1999 | Bills ..................................... | 410/42 |
| 5,938,092 | * | 8/1999 | Johnson ......................... | 296/26.08 X |

* cited by examiner

Primary Examiner—Stephen T. Gordon
(74) Attorney, Agent, or Firm—Sampson & Associates, P.C.

(57) ABSTRACT

A tail gate load organizing device is provided for carrying items longer than a pickup truck box floor with a tailgate down by moving a supporting point out onto the tailgate. The device includes an elongated base, vertical load partitions, base support system, and a tailgate attachment member. In use, the load organizing device is mountedly placed upon a tailgate and the attachment member is extended to bring about attaching engagement with a tailgate support which extendedly connects at one end to the tailgate and at another end to the pickup truck box side. The device is then useful in loading a pickup truck by causing an organized elongated load to be maintained within a pickup truck box and inclined relative to the floor of the truck box.

18 Claims, 5 Drawing Sheets

TAIL GATE LOAD ORGANIZING DEVICE

BACKGROUND OF THE INVENTION

1. Field of the Invention

The present invention relates to pickup truck load organizers and more particularly to a new tail gate load organizing device for allowing items longer than a pickup truck box floor to be carried with a tailgate down by moving a supporting point out onto the tailgate.

2. Background Information

The use of pickup truck load organizers is known in the prior art. Examples of pickup truck load organizers include those disclosed by U.S. Pat. No. 4,023,850; U.S. Pat. No. 4,389,067; U.S. Pat. Des. No. 248,228; U.S. Pat. No. 5,116,096; U.S. Pat. No. 4,114,944; and U.S. Pat. No. 5,265,993.

Such devices have been devised to solve various drawbacks associated with transporting loads within the beds of pickup trucks. One problem in particular is that of safely and securely transporting elongated loads which are longer than the bed of a pickup truck. Pickup trucks conveniently include a tailgate 4 which may be lowered into an open position to facilitate carrying loads which are longer than the bed 8 of the truck. This approach generally provides satisfactory results when transporting bulky items such as furniture and the like, which can be relatively easily secured to the truck with straps etc., to minimize shifting during transport. This approach however has not proven entirely effective for carrying elongated loose items such as lumber, piping and the like, as they tend to shift laterally and/or slide out of the truck box through the open tailgate during acceleration, etc. In an attempt to reduce or eliminate the possibility of such a load sliding out of the truck bed during transport, it has been common practice among many truck owners to close the tailgate and simply rest such oversized objects on the upper lip or edge of the closed tailgate. While this approach may help prevent the articles from sliding out of the truck bed during transport, this arrangement tends to place a relatively large portion of the carried items above the sides of the pickup truck box to substantially reduce the lateral support provided by the box side walls. Moreover, this approach concentrates a substantial portion of the weight of the load on the upper edge of the tailgate which tends to dent or otherwise damage the upper edge.

Thus, a need exists for a load organizing device for allowing items longer than a pickup truck box floor to be carried.

SUMMARY OF THE INVENTION

According to the present invention, a load organizing device for a pickup truck box includes an elongated base adapted for operable engagement with the pickup truck box, the elongated base adapted to support a load at a location spaced from the plane of the bed, and load partitions adapted to extend from said elongated base to receive the load therebetween so that an elongated load disposed within the pickup truck box is adapted for being supported therein at an incline relative to the plane of the bed.

In another aspect of the present invention a tail gate load organizing device includes an elongated base, vertical load partitions removably attached to the elongated base, a base support system disposed on said elongated base, and a tailgate attachment member adapted to selectively and removably n secure the load organizing device to a pickup truck.

The above and other features and advantages of this invention will be more readily apparent from a reading of the following detailed description of various aspects of the invention taken in conjunction with the accompanying drawings.

DETAILED DESCRIPTION OF THE PREFERRED EMBODIMENTS

Figure 2:
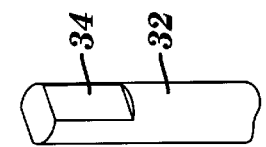
FIG. 2 is an enlarged detail view of a vertical load partition of the present invention.

With reference now to the drawings, a load organizing device embodying the principles and concepts of the present invention and generally designated by the reference numeral 10 will be described. For clarity of exposition, like features shown in the accompanying drawings shall be indicated with like reference numerals and similar features a shown in alternate embodiments in the drawings shall be indicated with similar reference numerals.

Figure 1:
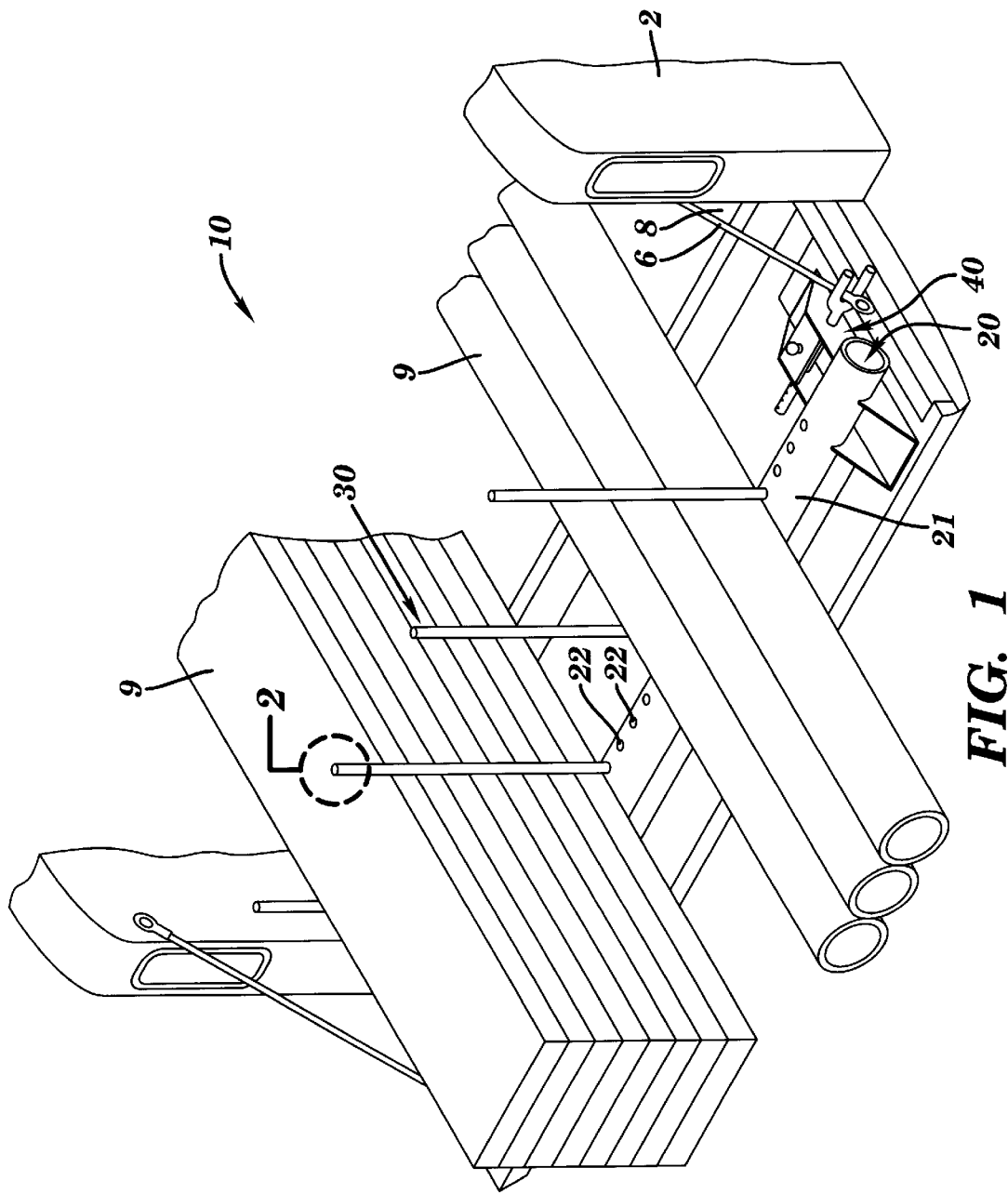
FIG. 1 is a perspective view of a load organizing device in use according to the present invention.
Figure 3:
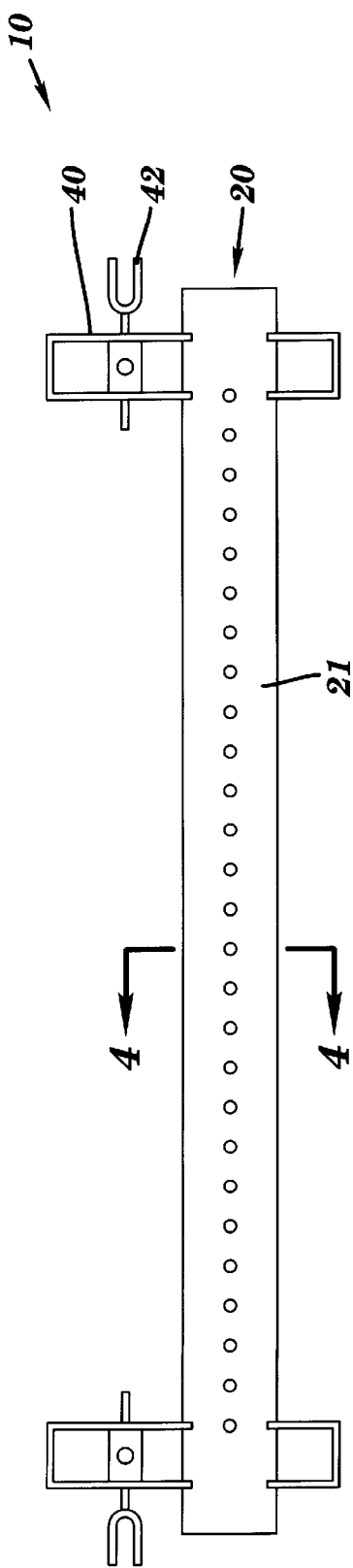
FIG. 3 is a plan view of the present invention.
Figure 4:
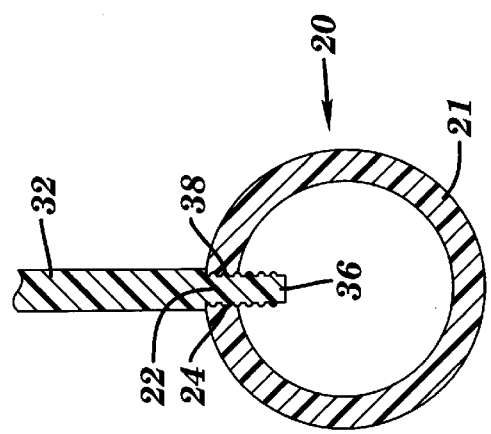
FIG. 4 is a cross-sectional view taken along line 4—4 of FIG. 3.
Figure 6:
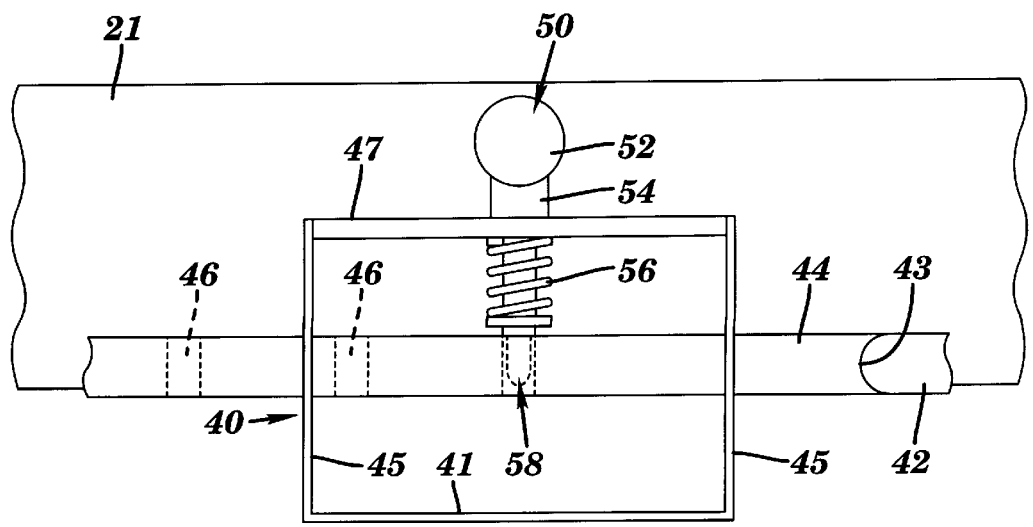
FIG. 6 is an enlarged detail view of a selective engagement control means of the present invention.
Figure 7:
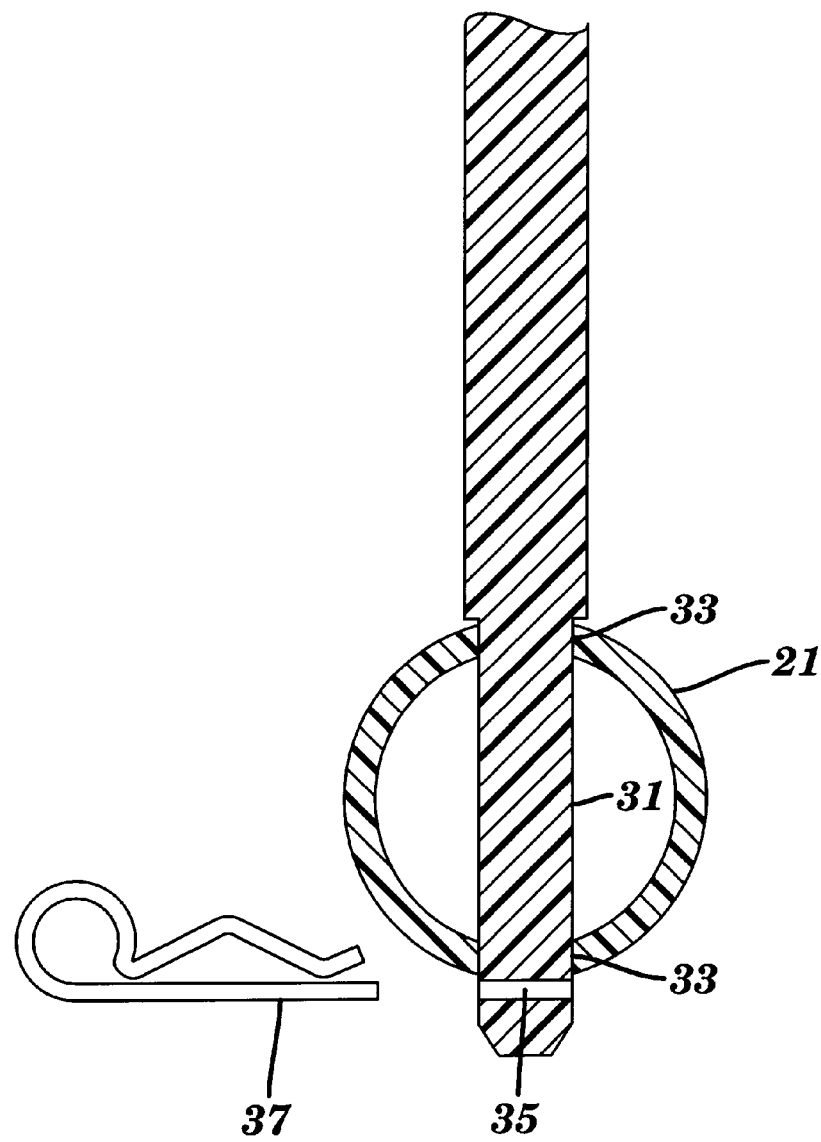
FIG. 7 is a cross-sectional view of a portion of an alternate embodiment of the present invention with a hair pin rotated 90 degrees for clarity.
Figure 8:
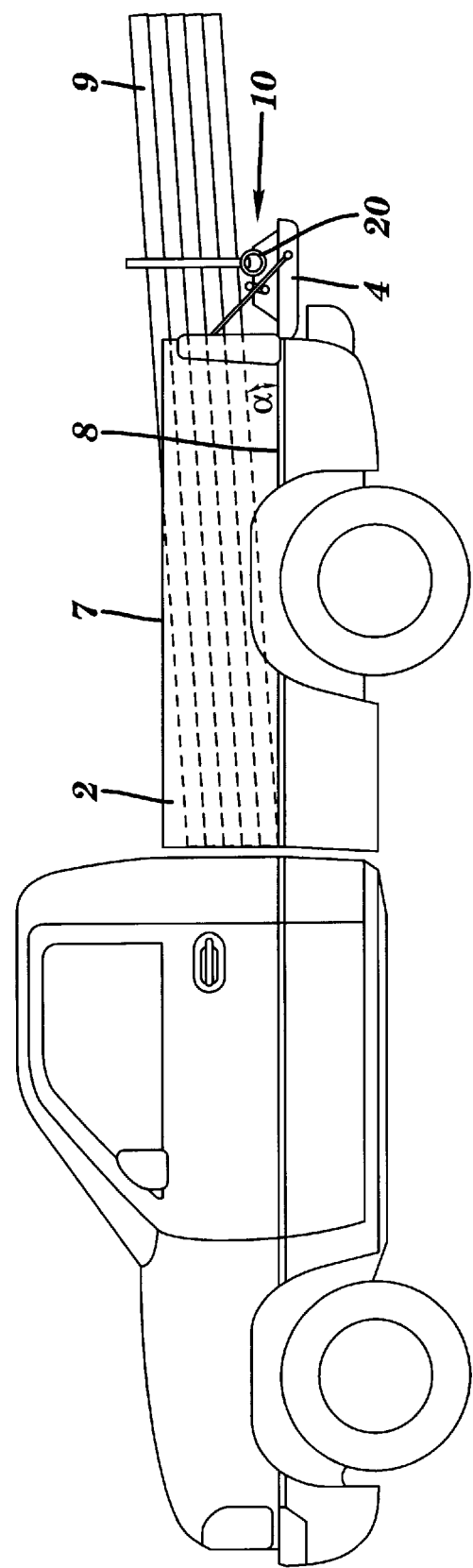
FIG. 8 is a side elevational view of the load organizing device of FIG. 1 in use on a pickup truck in accordance with the present invention.

Referring to FIGS. 1–8, the tail gate load organizing device 10 of the present invention advantageously allows items longer than a pickup truck box floor or bed to be safely and efficiently carried with a tailgate in its open or down position by providing a support on the tail gate as best shown in FIGS. 1 and 8.

More specifically, in one embodiment, the load organizing device 10 includes an elongated base 20, vertical load partitions 30, a base support system 40, and a selective engagement control means 50. The elongated base 20 is fixedly attached to the base support system 40 and the selective engagement control means 50 is retainably and removably attached to a pickup truck box side 2. The vertical load partitions 30 are removably attached to the elongated base 20.

As best illustrated in FIGS. 1–7, the elongated base 20 includes an elongated tube 21 which is cylindrical in shape and includes a plurality of partition apertures 22 which are inclined and oriented radially upward and through a wall of the elongated tube 21 where the partition apertures 22 are tangential to an uppermost horizontal plane.

The partition apertures 22 further include engaging threads 24 which threadedly engage tapered shank threads 38 which in turn form an outer periphery of the vertical load partitions 30.

The vertical load partitions 30 include a partition shaft 32 having a partition shank 36 at a lower end and a tool attachment means 34 located at an upper end and where the tapered shank threads 38 are specifically formed into the outer periphery of the partition shank 36 of the vertical load partitions 30.

In an alternate embodiment shown in FIG. 7, the vertical load partitions each have a smooth shank 31 of a reduced diameter for being slidably received by diametrically opposed smooth apertures 33 formed in the tube 21. A diametrically disposed bore 35 is formed in the lower end of each vertical load partition of the alternate embodiment. Such bore is adapted to receive a hair pin 37 for the purposes of maintaining the vertical load partitions of the alternate embodiment in engagement with the tube. By utilizing both walls of the tube, the alternate embodiment affords increased strength.

Figure 5:
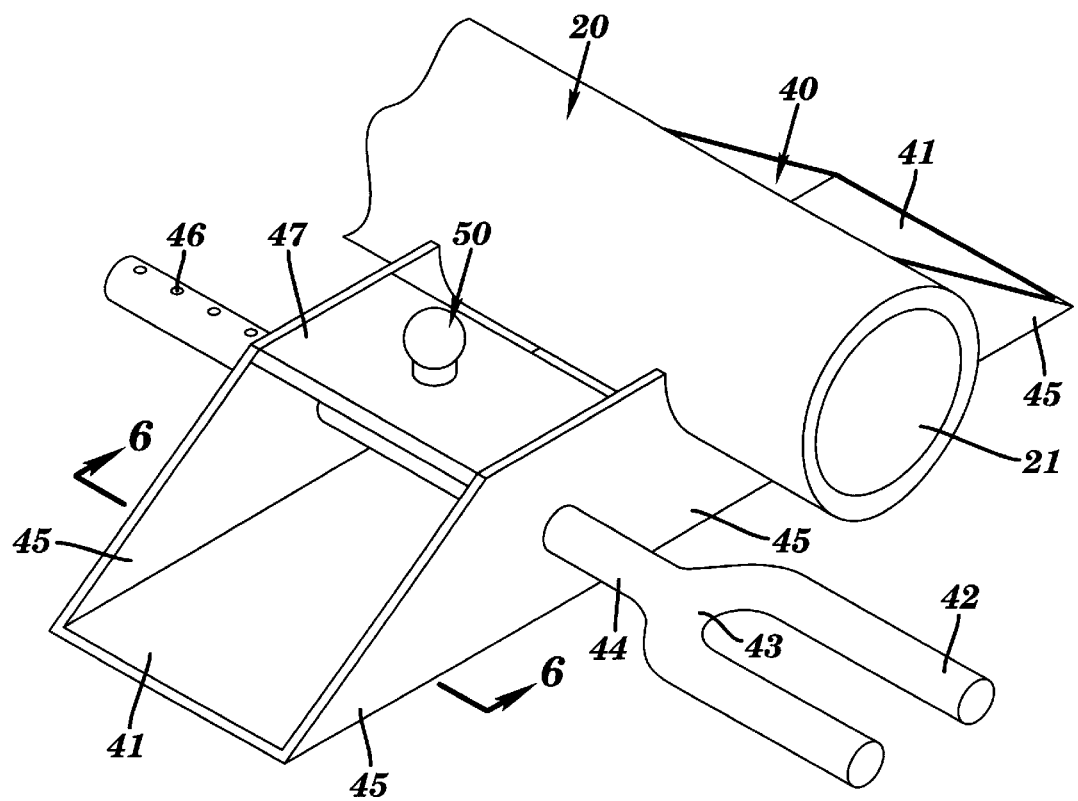
FIG. 5 is an enlarged detail view of a base support system of the present invention.

Referring to FIG. 5, the base support system 40 is comprised of a base bottom 41, a tailgate support attachment means 42, a base side walls 45, and a base top 47 where the base side walls 45 are perpendicularly upwardly extending protrusions of the base bottom 41 and where the base top 47 is disposed between the base side walls 45 at an upper end of the base side walls 45 and where the base top 47 is opposite the base bottom 41 in a spaced apart relationship and where the base top 47 together with the base side walls 45, supports the tailgate support attachment means 42.

Additionally, referring to FIGS. 5 and 6, the tailgate support attachment means 42 includes a fork having a fork base 43, a fork shaft 44, and adjustment apertures 46 where the fork further includes a plurality of prongs and the fork base 43 interconnects the plurality of prongs and the fork shaft 44 together integrally and where the adjustment apertures 46 are included in the fork shaft 44.

Furthermore, the adjustment apertures 46 are further defined as holes which extend through the fork shaft 44 and are oriented perpendicular to a plane defined by the plurality of prongs.

Additionally, in a further embodiment (not shown) the plurality of prongs can be replaced by a single prong adapted to extend between the tailgate 4 and the tailgate support 6 to prevent the device 10 from sliding out of the pickup truck during transport. The use of the device 10 will be discussed in greater detail hereinbelow.

The selective engagement control means 50 includes a handle 52, a handle base 54, a handle spring 56, and an engagement pin 58. The handle 52 is fixedly attached to an upper end of the handle base 54 and a lower end of the handle base 54 is fixedly attached to a proximal end of the engagement pin 58. A distal end of the engagement pin 58 protrudes down through the base top 47 and into any one of the adjustment apertures 46. The handle base 54 and the engagement pin 58 further include elongated cylinders in which the handle base 54 is of a larger diameter than the engagement pin 58 and where the handle spring 56 matingly and slidingly surrounds the engagement pin 58 and is held in a spring biased position to the engagement pin 58 and applies spring separating pressure between the base top 47 and the engagement pin 58 and therefor causes the engagement pin 58 to automatically engage the fork shaft 44.

Furthermore, the handle 52, the handle base 54, the handle spring 56, and the engagement pin 58 are each disposed in concentric relationship to one another.

In use, the tail gate load organizing device 10 is placed upon a tailgate 4 and the selective engagement control means 50 is extended to bring about attaching engagement with a tailgate support 6 which extendedly connects at one end to the tailgate 4 and at another end to the pickup truck box side 2. The device is then useful in loading a pickup truck by organizing an elongated load 9 and inclining the load relative to the plane defined by a pickup truck box floor 8.

Thus, in the embodiments shown and described herein, the tail gate load organizing device 10 is advantageously fastened to tailgate 4 of a pickup truck quickly and simply when needed to carry a load, without the need for drilling holes or otherwise making modifications which may damage the finish on the truck. Moreover, the selective engagement control means 50 enables the device 10 to be quickly and conveniently removed from the tailgate 4 when not in use for storage, etc.

Furthermore, although the embodiments of load organizing device 10 shown and described hereinabove includes a "quick-release" control means 50, the present invention may be provided with more conventional fastening means. For example, in an alternate embodiment, the load organizing device 10 may be mounted onto the tailgate 4 by conventional fasteners such as bolts, screws, rivets or expandable rubber mounts typically used to fasten racks and the like to holes within upper portions of pickup truck box sides without damaging the finish of the truck. In this regard, holes may be provided within the tailgate 4 to accommodate such expandable rubber mounts. In a still further embodiment, the device 10 may be permanently mounted onto the tailgate 4 such as by welding either during or after manufacture of the pickup truck or tailgate 4 thereof. For example, portions of device 10, such as elongated base 20, or similar structure which serves to elevate a portion of a load relative to the floor or bed 8 of the pickup truck as discussed hereinbelow, may be formed integrally into the tailgate 4 during manufacture thereof. Suitable load partitions may then be installed when desired to provide lateral support to a load.

Turning now to FIG. 8, as mentioned hereinabove, the tailgate load organizing device 10 of the present invention includes an elongated base 20 which serves to support a distal portion of an elongated load 9 in a raised position relative to the pickup truck bed or box floor 8. This aspect serves to incline the elongated load 9 which, as shown, is supported at its proximal end by the pickup truck bed 8 to thus incline the elongated load 9 by an angle $\alpha$ relative to the bed 8. This aspect advantageously tends to help prevent the load 9 from creeping or sliding out of the pickup truck during transport while also tending to shift the center of gravity of load 9 towards the front of the truck for improved weight distribution.

The load organizing device 10 may be disposed on the bed 8 at a rearward or distal end thereof, or in a preferred embodiment as shown, be placed on the tailgate 4 to enable relatively longer loads 9 to be carried. The present invention thus enables elongated loads 9 which are longer than the bed 8 of a pickup truck to be securely transported without resting on an upper edge of a closed tailgate 4. Moreover, the present invention advantageously provides lateral support to loads 9 of various size to substantially prevent or reduce lateral shifting of a load 9 during transport. A still further advantage of the present invention is that the load carrying ability of tailgate 4 when disposed in its open or horizontal position is effectively utilized to facilitate carrying loads 9 which are longer than may otherwise be transported in the pickup truck. In a preferred embodiment, base 20 is provided with a pre-determined size and shape sufficient to incline a load 9 at an angle a which effectively raises the distal end of the load 9 from bed 8 without raising the distal end above the upper edge 7 of the pickup truck box side 2. This advantageously enables the box sides 2 to provide lateral support, if necessary, and to maintain a relatively low center of gravity of the load 9. In a preferred embodiment, base 20 is sized and shaped to support load 9 at a distance or height above the plane of bed 8 within a range of from approximately 2–10 inches.

With respect to the above description, it is to be realized that optimum dimensional relationships for the parts of the invention, including variations in size, materials, shape, form, function and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Having thus described the invention, what is claimed is:

1. A load organizing device for a pickup truck box having a substantially planar bed, the load organizing device comprising:

an elongated base adapted for operable engagement with the pickup truck box, said elongated base adapted to support a load at a location spaced from the plane of the bed;

load partitions adapted to extend from said elongated base to receive the load therebetween;

wherein an elongated load disposed within said pickup truck box is adapted for being supported therein at an incline relative to the plane of the bed;

wherein the elongated base includes is an elongated tube which is cylindrical in shape and includes a plurality of partition apertures disposed inline and on a radially upward wall portion of the elongated tube, wherein the partition apertures are tangential to a plane parallel to the plane of the bed.

2. The load organizing device of claim 1, wherein said load partitions are removably engageable with said elongated base.

3. The load organizing device of claim 1, wherein said elongated base is adapted for being removably engaged with the pickup truck box.

4. The load organizing device of claim 3, further comprising a selective tailgate attachment member adapted to removably attach the load organizing device to a pickup truck.

5. The load organizing device of claim 3, further comprising a base support system adapted to support said elongated base on the pickup truck.

6. The load organizing device of claim 4, wherein the tailgate attachment member comprises a fork having a fork base, a fork shaft, and adjustment apertures where the fork includes a plurality of prongs and the fork base interconnects the plurality of prongs and the fork shaft together integrally and where the adjustment apertures are included in the fork shaft.

7. The load organizing device of claim 6, wherein the adjustment apertures further comprise holes which extend through the fork shaft and are oriented substantially perpendicularly to a plane defined by the plurality of prongs.

8. The load organizing device of claim 7, wherein said tailgate attachment member further comprises a selective engagement control assembly having a handle, a handle base, a handle spring and an engagement pin where the handle is fixedly attached to an upper end of the handle base and where a lower end of the handle base is fixedly attached to a proximal end of the engagement pin and a distal end of the engagement pin protrudes down through the elongated base and into any one of the adjustment apertures and where the handle base and the engagement pin are further defined as elongated cylinders where the handle base is of a larger diameter than the engagement pin and where the handle spring matingly and slidingly surrounds the engagement pin and is maintained in a spring biased position to the engagement and applies spring separating pressure between the elongated base and the engagement pin wherein the engagement pin is adapted to engage the fork shaft.

9. The load organizing device of claim 8, wherein the handle, the handle base, the handle spring, and the engagement pin are each disposed in concentric relationship to one another.

10. The load organizing device of claim 9, wherein the device is mountedly placeable upon a tailgate and the selective engagement control assembly is extended to bring about attaching engagement with a tailgate support which extendedly connects at one end to the tailgate and at another end to a pickup truck box side.

11. The load organizing device of claim 1, wherein the partition apertures are smooth for slidably receiving partition shanks of the load partitions, wherein the partition shanks are smooth and extend entirely through the tube and are each maintained therein via a pin.

12. The load organizing device of claim 11, further comprising a base support system to support the elongated base on the pickup truck, the base support system being comprised of a base bottom, a tailgate support attachment member, base side walls, and a base top where the base side walls are perpendicularly upwardly extending protrusions of the base bottom and where the base top is disposed between the base side walls at an upper end of the base side walls and where the base top is opposite the base bottom in a spaced apart relationship and where the base top together with the base side walls, supports the tailgate support attachment member.

13. The load organizing device of claim 12, wherein the tailgate support attachment member is comprised of a fork having a fork base, a fork shaft, and adjustment apertures where the fork further includes a plurality of prongs and the fork base interconnects the plurality of prongs and the fork shaft together integrally and where the adjustment apertures are included in the fork shaft.

14. The load organizing device of claim 13, wherein the device is mountedly placeable upon a tailgate and a selective engagement control assembly is extended to bring about attaching engagement with a tailgate support which extendedly connects at one end to the tailgate and at another end to a pickup truck box side and where the device is then useful in loading a pickup truck by causing an organized elongated load to rest upon a pickup truck box floor.

15. A load organizing device for a pickup truck box having a bed, the load organizing device comprising:

an elongated base removably engageable with the pickup truck box, said elongated base adapted to support a load at a location spaced from a plane defined by the bed;

load partitions adapted to extend orthogonally from said elongated base to receive the load therebetween;

wherein an elongated load disposed within said pickup truck box is adapted for being supported therein at an incline relative to the plane of the bed;

a base support system adapted to support said elongated base on the pick up truck; wherein said base support system is comprised of a base bottom, a tailgate support attachment member, base side walls, and a base top where the base side walls acre perpendicularly upwardly extending protrusions of the base bottom and where the base top is disposed between the base side walls at an upper end of the base side walls and where the base top is opposite the base bottom in a spaced apart relationship and where the base top together with the base side walls, supports said tailgate support attachment member.

16. A load organizing device for a pickup truck box having a bed, the load organizing device comprising:

an elongated base adapted for operable and removable engagement with the pickup truck box, said elongated base adapted to support a load at a location spaced from a plane defined by the bed; and load partitions adapted to extend orthogonally from said elongated base to receive the load therebetween;

wherein an elongated load disposed within said pickup truck box is adapted for being supported therein at an incline relative to the plane of the bed;

a selective tailgate attachment member adapted to removably attach the load organizing device to a pick up truck, the tailgate attachment member including a fork having a fork base, a fork shaft, and adjustment apertures where the fork further includes a plurality of prongs and the fork base interconnects the plurality of prongs and the fork shaft together integrally and where the adjustment apertures are included in the fork shaft.

17. The Load organizing device of claim 16, wherein the adjustment apertures are further defined as holes which go through the fork shaft and are oriented perpendicular to a plane defined by the plurality of prongs.

18. The load organizing device of claim 17, wherein the load partitions are comprised of a partition shaft having a partition shank at one end and a tool attachment means located at an other end and including tapered shank threads formed into the outer periphery of the partition shank of the load partitions.

* * * * *